United States Patent
Cai et al.

(10) Patent No.: US 12,050,778 B2
(45) Date of Patent: Jul. 30, 2024

(54) DATA RESTORATION METHOD AND RELATED DEVICE

(71) Applicant: HUAWEI TECHNOLOGIES CO., LTD., Guangdong (CN)

(72) Inventors: Zhifang Cai, Shenzhen (CN); Baochen Hou, Shenzhen (CN); Zhao Zhou, Chengdu (CN); Ping Zou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 78 days.

(21) Appl. No.: 17/736,520

(22) Filed: May 4, 2022

(65) Prior Publication Data

US 2022/0334733 A1  Oct. 20, 2022

Related U.S. Application Data

(63) Continuation of application No. PCT/CN2020/095591, filed on Jun. 11, 2020.

(30) Foreign Application Priority Data

Nov. 4, 2019 (CN) .......................... 201911065652.2
Jan. 16, 2020 (CN) .......................... 202010046137.6

(51) Int. Cl.
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0653* (2013.01); *G06F 3/0689* (2013.01); *G06F 11/1448* (2013.01)

(58) Field of Classification Search
CPC ...... G06F 3/0619; G06F 3/065; G06F 3/0653; G06F 3/0689; G06F 11/1448;
(Continued)

(56) References Cited

U.S. PATENT DOCUMENTS

| 5,787,242 A | 7/1998 | Dekoning et al. |
| 2006/0215456 A1 | 9/2006 | Chen |

(Continued)

FOREIGN PATENT DOCUMENTS

| CN | 1955940 A | 5/2007 |
| CN | 103729268 A | 4/2014 |

(Continued)

*Primary Examiner* — Jason W Blust
(74) *Attorney, Agent, or Firm* — HUAWEI TECHNOLOGIES CO., LTD.

(57) ABSTRACT

A data restoration method and a related device are provided. To avoid a data loss in a cache in a process of restoring an offline RAID system, a security area is configured in a disk, where the security area is used to back up data in the cache of a RAID controller after the RAID system is offline. Therefore, when a first instruction used to indicate that the RAID system is offline is obtained, the data in the cache may be backed up to the security area. In this way, after the RAID system is restored, the RAID system can obtain backup data of the data in the cache from the security area, to avoid problems such as an operating system startup failure or a user data loss caused by the data loss in the cache.

9 Claims, 7 Drawing Sheets

(58) Field of Classification Search
CPC ............. G06F 11/1076; G06F 11/1092; G06F 11/1441; G06F 11/1458
See application file for complete search history.

(56) References Cited

U.S. PATENT DOCUMENTS

| | | | |
|---|---|---|---|
| 2008/0040540 A1* | 2/2008 | Cavallo | G06F 11/1435 |
| | | | 711/173 |
| 2009/0327801 A1 | 12/2009 | Maeda et al. | |
| 2014/0325261 A1 | 10/2014 | Munireddy et al. | |
| 2015/0082081 A1 | 3/2015 | Akirav et al. | |
| 2017/0329674 A1* | 11/2017 | Sreedhar M. | G06F 12/128 |
| 2019/0220372 A1* | 7/2019 | Kang | G06F 11/1076 |

FOREIGN PATENT DOCUMENTS

| | | |
|---|---|---|
| CN | 104035830 A | 9/2014 |
| CN | 104657290 A | 5/2015 |
| CN | 108897644 A | 11/2018 |
| CN | 109298979 A | 2/2019 |
| CN | 111240903 A | 6/2020 |
| IN | 105955841 A | 9/2016 |

\* cited by examiner

DATA RESTORATION METHOD AND RELATED DEVICE

CROSS-REFERENCE TO RELATED APPLICATIONS

This is a continuation of International Patent Application No. PCT/CN2020/095591, filed on Jun. 11, 2020, which claims priority to Chinese Patent Application No. 201911065652.2, filed on Nov. 4, 2019 and Chinese Patent Application No. 202010046137.6, filed on Jan. 6, 2020. All of the aforementioned patent applications are hereby incorporated by reference in their entireties.

TECHNICAL FIELD

This application relates to the field of computer storage technologies, and in particular, to a data restoration method and a related device.

BACKGROUND

A redundant array of independent disks (RAID) system includes a disk set of a plurality of disks, and the disks provide an external storage function as a whole. When the RAID system cannot provide the external storage function, that is, when the RAID system is offline, the RAID system needs to be restored to provide the external storage function.

In the current technology, to facilitate management of the disks in the RAID system, the RAID system may further include a RAID controller. There may be two scenarios in which the RAID system is offline. In the first scenario, because one or more disks in the RAID system are faulty, the RAID system cannot provide the external storage function. In this scenario, the faulty disks are replaced to restore the offline RAID system. In the second scenario, because the RAID controller included in the RAID system is faulty, the RAID system cannot provide the external storage function. In this scenario, the RAID controller is replaced to restore the offline RAID.

A cache (cache) is further configured in the RAID controller, and is configured to cache data that is read by a processor from a disk of the RAID system or data that is to be written to the disk of the RAID system. In this case, in the first scenario, to avoid that data in new disks is incompatible with data in the cache of the RAID controller, the data in the cache needs to be cleared before disk restoration. As a result, the data in the cache is lost. In the second scenario, the RAID controller is directly replaced with a new RAID controller, and this also causes a loss of original data in the cache.

SUMMARY

This application provides a data restoration method and a related device, to avoid a data loss in a cache in a data restoration process. Technical solutions are as follows.

According to a first aspect, this application provides a data restoration method. The method is applied to a RAID controller. The RAID controller is connected to a plurality of disks, a data area and a security area are configured in each of the plurality of disks, and a cache is configured in the RAID controller. The method includes: obtaining a first instruction, where the first instruction is used to indicate that a RAID system in which the RAID controller is located is offline, and the RAID system being offline means that a quantity of faulty disks in the plurality of disks is greater than an allowed quantity; and storing first cache data in the cache into a security area of a first disk that is not faulty in the plurality of disks.

In this application, to avoid a data loss in the cache in a process of restoring the offline RAID system, a security area is configured in a disk, where the security area is used to back up data in the cache of the RAID controller after the RAID system is offline. Therefore, when the first instruction used to indicate that the RAID system is offline is obtained, the data in the cache may be backed up to the security area. In this way, after the RAID system is restored, the RAID system can obtain backup data of the data in the cache from the security area, to avoid problems such as an operating system startup failure or a user data loss caused by the data loss in the cache.

According to the first aspect, in a possible implementation of this application, in the method, a second instruction may be further obtained, where the second instruction is used to indicate that the RAID system is restored. The RAID system being restored means that the quantity of faulty disks in the plurality of disks is less than or equal to the allowed quantity after faulty disk restoration. In this case, the first cache data is obtained from the security area of the first disk, and is stored into the data areas of the plurality of disks obtained after the disk restoration.

After the second instruction used to indicate that the RAID system is restored is obtained, the data in the cache that has been backed up may be restored, to avoid problems such as the operating system startup failure or user data loss caused by the data loss in the cache.

According to the first aspect, in another possible implementation of this application, in the method, before the first cache data is stored into the data areas in the plurality of disks obtained after the disk restoration, second cache data in the cache after the disk restoration may be further obtained. When the first cache data is consistent with the second cache data, the first cache data is stored into the data areas of the plurality of disks obtained after the disk restoration.

For a scenario in which the RAID system is offline due to a fault of a disk, data in the restored disk may be incompatible with the original data in the cache. Therefore, in this offline scenario in this application, the data in the cache is not cleared before the disk restoration, so that whether to flush the first cache data to disks can be determined based on consistency between the data (namely, the second cache data) in the cache after the disk restoration and the backup data of the data (namely, the first cache data) in the cache. Specifically, when the data in the restored disk does not conflict with the first cache data, the first cache data may be directly flushed to the disks, to improve efficiency of restoring the first cache data.

According to the first aspect, in another possible implementation of this application, when the second cache data is inconsistent with the first cache data, cache data flush prompt information may be sent to an administrator end, where the cache data flush prompt information is used to prompt whether to flush the first cache data to the disks. When an acknowledgment message is received, the first cache data is stored into the data areas of the plurality of disks obtained after the disk restoration, where the acknowledgment message is used to indicate to write the first cache data to the data areas of the plurality of disks obtained after the disk restoration.

According to the first aspect, in another possible implementation of this application, after the cache data flush prompt information is sent to the administrator end, a discard message may be further received, where the discard message is used to indicate to clear the first cache data.

In this application, when the data in the cache after the disk restoration is inconsistent with the first cache data, it indicates that the data in the restored disk conflicts with the first cache data. In this case, to avoid accidental data deletion, whether to discard the first cache data may be determined based on a prompt of a user.

According to the first aspect, in another possible implementation of this application, after the first cache data is obtained from the security area of the first disk, the first cache data stored into the security area of the first disk may be further cleared.

The security area is used to back up the data in the cache of the RAID controller of the offline RAID system. Therefore, to facilitate backup of the data in the cache when the RAID system is offline next time in a timely manner, the first cache data stored into the security area of the first disk may be cleared. That is, each time the first cache data is restored, data in the security area is cleared in time. In this way, when the RAID system is offline again, the data in the cache can be directly backed up in the security area in which the data is cleared.

According to the first aspect, in another possible implementation of this application, a total capacity of security areas configured in the plurality of disks is greater than or equal to a capacity of the cache, to ensure that the data in the cache can be stored into the security areas.

According to the first aspect, in another possible implementation of this application, an address range corresponding to the security area configured in each disk is located after an address range corresponding to the data area configured in the same disk, to ensure continuity of the data area.

According to a second aspect, this application provides a data restoration method. The method is applied to a computer system, and a RAID controller and a plurality of disks are configured in the computer system. A data area and a security area are configured in each of the plurality of disks, and a cache is configured in the RAID controller. The method includes: obtaining a first instruction, where the first instruction is used to indicate that a RAID system in which the RAID controller is located is offline, and the RAID system being offline means that the RAID controller is faulty; and storing first cache data in the cache into security areas of the plurality of disks.

In this application, to avoid a data loss in the cache in a process of restoring the offline RAID system, a security area is configured in a disk, where the security area is used to back up data in the cache of the RAID controller after the RAID system is offline. Therefore, when the first instruction used to indicate that the RAID system is offline is obtained, the data in the cache may be backed up to the security area. In this way, after the RAID system is restored, the RAID system can obtain backup data of the data in the cache from the security area, to avoid problems such as an operating system startup failure or a user data loss caused by the data loss in the cache.

According to the second aspect, in a possible implementation of this application, in this method, a second instruction may be further obtained, where the second instruction is used to indicate that the RAID system is restored, and the RAID system being restored means that the faulty RAID controller has been replaced. In this case, the first cache data is obtained from a security area of a first disk, and is stored into data areas of the plurality of disks after the RAID controller is replaced.

After the second instruction used to indicate that the RAID system is restored is obtained, the data in the cache that has been backed up may be restored, to avoid problems such as the operating system startup failure or user data loss caused by the data loss in the cache.

According to the second aspect, in a possible implementation of this application, an implementation of storing the first cache data into the data areas of the plurality of disks after the RAID controller is replaced may be: writing the first cache data to a cache in a replaced RAID controller; and when a flush instruction for data in the cache is detected, writing data in the cache of the replaced RAID controller to the data areas of the plurality of disks after the RAID controller is replaced.

If the RAID system is offline due to a fault of the RAID controller, after the RAID controller is replaced, that is, after the RAID system is restored, the cache is also configured in the replaced RAID controller. Therefore, the first cache data may be written to the cache in the replaced RAID controller, so that when the flush instruction for the data in the cache is detected subsequently, the data in the cache in the replaced RAID controller is written to the data areas of the plurality of disks after the RAID controller is replaced. In other words, for an offline scenario in which the RAID controller is faulty, the first cache data may be first restored to the cache in the replaced RAID controller, and subsequently restored to the data areas in a unified manner, to implement batch data writing, so as to improve a data writing speed.

According to a third aspect, a RAID controller is provided. The RAID controller has a function of implementing behavior of the data restoration method provided in the first aspect. The RAID controller includes at least one module, and the at least one module is configured to implement the data restoration method according to the first aspect.

According to a fourth aspect, a computer system is provided. The computer system has a function of implementing behavior of the data restoration method provided in the second aspect. The computer system includes at least one module, and the at least one module is configured to implement the data restoration method according to the second aspect.

According to a fifth aspect, an electronic device is provided, where a structure of the electronic device includes a processor and a memory, and the memory is configured to store a program that supports the electronic device in performing the data restoration method according to the first aspect or the second aspect, and storing data used to implement the data restoration method according to the first aspect or the second aspect. The processor is configured to execute the program stored in the memory. An operation apparatus of the storage device may further include a communications bus, and the communications bus is configured to establish a connection between the processor and the memory.

According to a sixth aspect, a computer-readable storage medium is provided. The computer-readable storage medium stores instructions, and when the instructions are run on a computer, the computer is enabled to perform the data restoration method according to the first aspect or the second aspect.

According to a seventh aspect, a computer program product including instructions is provided. When the computer program product is run on a computer, the computer is enabled to perform the data restoration method according to the first aspect or the second aspect.

DESCRIPTION OF EMBODIMENTS

To make objectives, technical solutions, and advantages of this application clearer, the following further describes implementations of this application in detail with reference to the accompanying drawings.

It should be understood that "a plurality of" in this specification means two or more than two. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

Before the embodiments of this application are described, an application scenario of the embodiments of this application is first described.

With an increasing service volume of modern data centers, more data needs to be run on a single server. When a capacity and security of a single disk are insufficient to support system services on a server, a plurality of disks need to be combined and used as a visible disk to meet actual requirements of the server. A disk group is a group of physical disks combined as a whole for external entities and is the basis of a virtual disk. A virtual disk is a continuous data storage unit divided from a disk group and can be considered as an independent disk. After configuration, the virtual disk can provide a higher capacity, security, and data redundancy than a physical disk.

In a RAID technology, a plurality of hard disks are combined into one or more hard disk array groups by using a virtualization storage technology to improve performance or data redundancy, or both.

Currently, a RAID controller is configured in a RAID system. A cache (cache) is configured in the RAID controller. The cache is also referred to as a high-speed cache. The cache may be a random access memory (RAM) that has a relatively fast access speed, for example, a static random access memory (SRAM).

The RAID controller performs read-ahead and write-back on data in the cache to guarantee and improve read/write performance. A size of the cache is generally 128 MB to 1 GB.

When reading required data from a disk in a read-ahead manner, the RAID controller reads and stores subsequent data into the cache. When a user accesses the data, the RAID controller can hit the data in the cache. This reduces disk seek operations to reduce response time and improve a data read speed.

When the RAID controller needs to write data to a disk in a write-back manner, the RAID controller first writes the data to the cache. The RAID controller writes data to the disk only after written data is accumulated to a specified extent. In this way, data can be written in batches and a data write speed is improved.

In addition, the cache in the RAID controller cannot guarantee data persistence. If the RAID controller is powered off abnormally, the data in the cache may be lost. To provide power-off protection for the data in the cache, the RAID controller is powered by a super battery and flushes the data in the cache to the disk after the system is powered on. Alternatively, the RAID controller is powered by a supercapacitor and writes the data in the cache to a nonvolatile storage medium, to ensure that the data in the cache is not lost when the system is powered off abnormally.

Fault tolerance can ensure data integrity and a data processing capability when an error or a fault of a disk occurs in a subsystem. A server vendor usually implements fault tolerance on RAIDs 1, 5, 6, 10, 50, and 60 by using a RAID controller through a redundant disk group. The RAIDs 1, 5, 6, 10, 50, and 60 are respectively used to indicate different types of RAIDs. For detailed descriptions of the different types of RAIDs, refer to related technologies. Details are not described in the embodiments of this application.

It should be noted that for any type of RAID, when a quantity of faulty disks does not exceed an allowed quantity, data in a faulty disk may be restored by using another disk. When the quantity of faulty disks exceeds the allowed quantity, the data in the faulty disk cannot be restored by using the another disk. Therefore, each type of RAID has a quantity of disks that are allowed to be faulty.

For example, in the RAID 1, data is mirrored and stored on paired disks. Therefore, when a fault such as an error or damage occurs in one of the paired disks, the data is not lost. That is, one disk is allowed to be faulty in the RAID 1. Similarly, in the RAID 5, one disk is allowed to be faulty. In the RAID 6, two disks are allowed to be faulty.

For ease of subsequent description, the RAID 1 and the RAID 5 are described herein.

In the RAID 1, the data is written to a working disk and a mirrored disk, and disk space utilization is 50%. If the working disk is faulty, the system automatically reads the data from the mirrored disk, and this does not affect user work.

In the RAID 5, data is distributed across disks in blocks. In the RAID 5, the data is not backed up. Instead, the data and corresponding parity check information are stored into each disk that forms the RAID 5, and the parity check information and the corresponding data are stored on different disks. If one disk in the RAID 5 is damaged, the damaged data may be restored by using data in remaining disks and corresponding parity check information.

In addition, the RAID may be in an online (Online) state, a degraded (Degrade) state, and an offline (Offline) state. The RAID 5 is used as an example. An allowed quantity of the RAID 5 is 1. Therefore, in a normal case (that is, no disk is faulty), the RAID is in the online state. When one disk is faulty, the RAID is in the degraded state. When two or more disks are faulty, the RAID is in the offline state. If the RAID is in the offline state, data in a cache is not written to a disk. After the RAID is restored to the degraded or online state, reserved data in the cache is written to the disk. Because the RAID in the degraded state can still store data, the degraded state and the online state may be collectively referred to as a normal working state.

After the RAID changes to the offline state, the data in the cache is not written to a hard disk. In this case, how to protect and restore the data in the cache is essential.

Currently, the RAID system is offline due to various causes. Therefore, corresponding restoration operations are different.

1. If the RAID system is offline due to a fault of a plurality of disk, the RAID system is restored by adding the offline disks to a disk group in the RAID system. In this scenario, to prevent the data in the cache from being incompatible with data in the newly added disks, the RAID controller usually needs to clear the data in the cache before importing an external configuration of the disks. As a result, the data in the cache is lost. That is, after the RAID system is offline, the RAID controller cannot confirm whether the data in the cache of the RAID controller is compatible with the data in the disks. To ensure system stability, the data in the cache needs to be cleared during an operation of restoring the RAID system. As a result, the data is lost.

2. If the RAID system is offline due to a fault of the RAID controller, the RAID system is restored by replacing the RAID controller. However, directly replacing of the RAID controller also causes a loss of the data in the cache.

In the foregoing two offline scenarios of the RAID system, even if the RAID state is restored to the online or degraded state, because data in the cache has been lost, problems such as an operating system startup failure due to file damage in an operating system or a data loss caused by file damage in a user data system may occur, and bring significant impact. Therefore, in a scenario of restoring the offline RAID system, the data in the cache needs to be backed up, so that the data that is backed up can be restored subsequently. A method for restoring the offline RAID system provided in this embodiment of this application can implement the technical effect.

For ease of subsequent description, a system for implementing a data restoration method provided in this embodiment of this application is first described.

Figure 1:
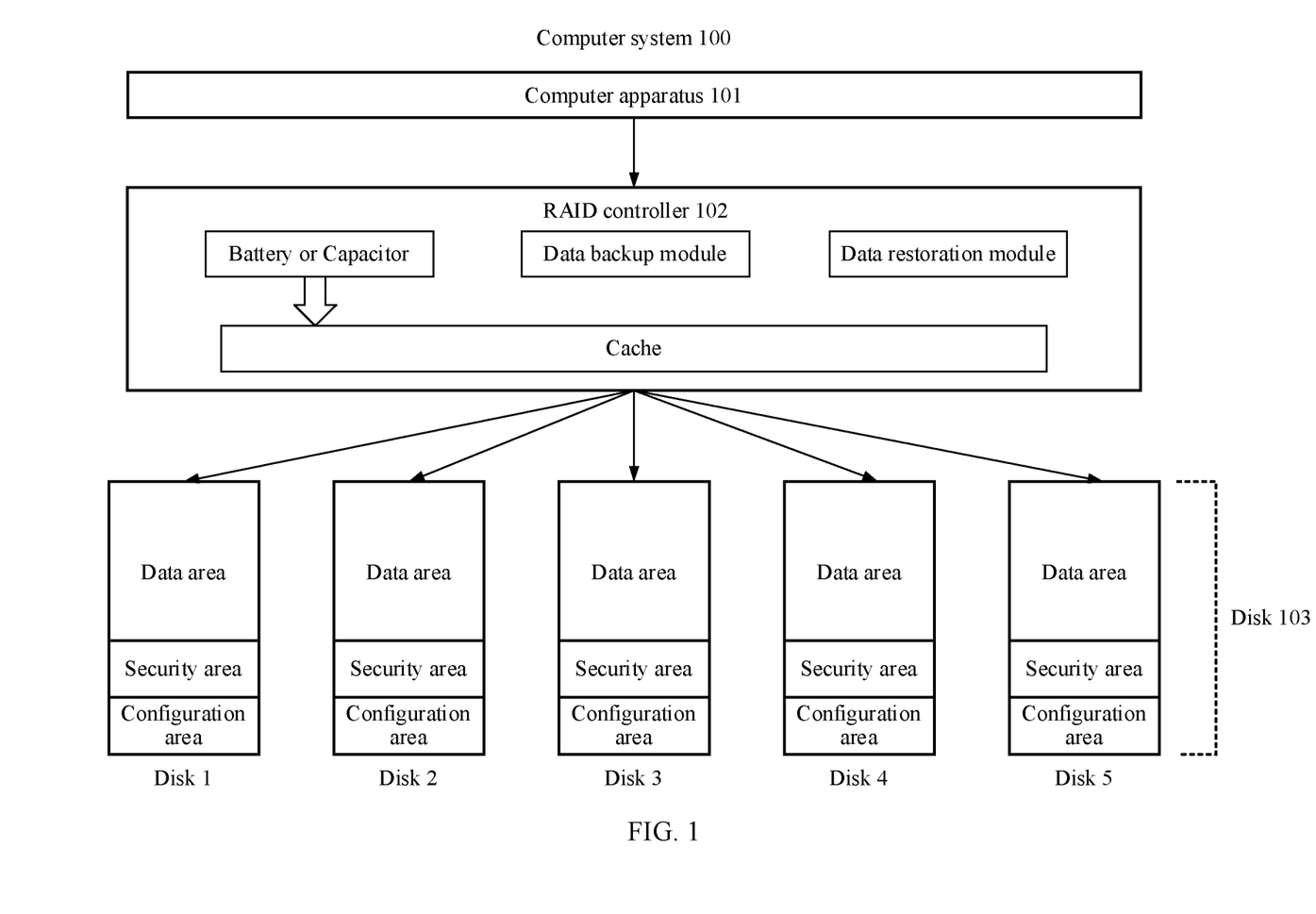
FIG. 1 is a diagram of an architecture of a computer system according to an embodiment of this application.

FIG. 1 is a diagram of an architecture of a computer system according to an embodiment of this application. As shown in FIG. 1, a system 100 includes a computer apparatus 101, a RAID controller 102, and a plurality of disks 103. The RAID controller 102 and the plurality of disks 103 form the RAID system provided in this embodiment of this application.

As shown in FIG. 1, the computer apparatus 101 communicates with the RAID controller 102, and the RAID controller 102 communicates with any one of the disks 103. The computer apparatus 101 is configured to send a read request or a write request to the RAID controller 102. The RAID controller 102 is configured to read data from the disks 103 according to the read request or write data to the disks 103 according to the write request.

As shown in FIG. 1, a cache (cache) and a battery or capacitor that supplies power to the cache are configured in the RAID controller. The battery or capacitor is used to supply power to the cache when the RAID controller is powered off, to prevent data in the cache from being lost due to a power failure of the RAID controller.

As shown in FIG. 1, for any disk, the disk includes a data area, a security area, and a configuration area. The data area is used to store data written to the disk by an operating system in the computer apparatus 101. The data area may also be referred to as a user data area. The security area is used to store the data in the cache of the RAID controller, to back up the data in the cache of the RAID controller. The configuration area is used to store RAID configuration information of the corresponding disk, where the RAID configuration information may include information such as a type of a RAID to which the disk belongs and a model of the RAID controller.

Figure 2:
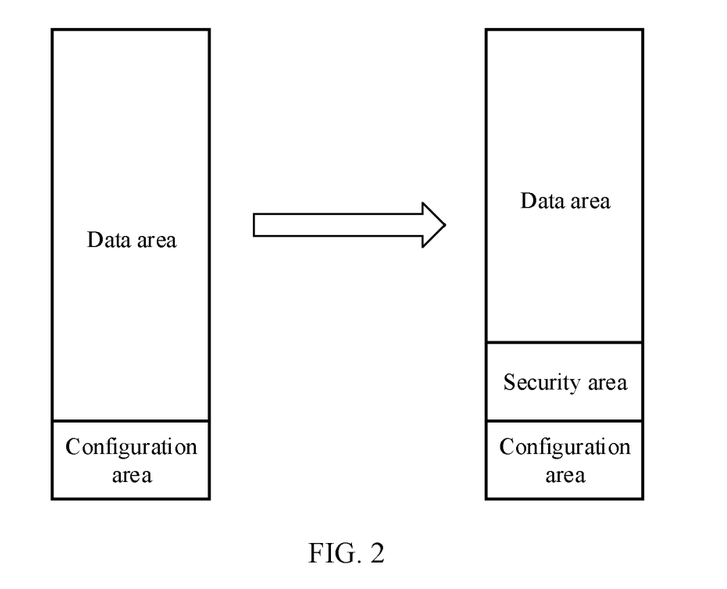
FIG. 2 is a schematic diagram of a space change of a disk to which a security area is introduced according to an embodiment of this application.

The configuration area generally occupies the last 512 MB to 1 GB of the disk. In a conventional disk, the other area excluding a configuration area is a data area. In this application, a part of space is divided from the data area to be used as a security area to back up the data in the cache. FIG. 2 shows a change process of space of a disk to which a security area is introduced.

To ensure that the data in the cache can be stored into the security area, a capacity (the capacity may also be referred to as a space size) of a security area in each disk may be consistent with a capacity of the cache in the RAID controller. Optionally, if the data in the cache is stored into different security areas in a distributed manner, a limitation condition of the capacity of the security area may be set as that a total capacity of security areas configured in the plurality of disks is greater than or equal to the capacity of the cache. Alternatively, to further ensure stability of the computer system, a limitation condition of the capacity of the security area may be set as follows: When a quantity of faulty disks does not exceed an allowed quantity in the computer system, a total capacity of security areas configured in remaining disks is greater than or equal to the capacity of the cache.

Therefore, in a possible implementation, the RAID controller may configure the security areas in the following procedure: obtaining the capacity of the cache, and configuring the capacity of the security area in each disk based on the capacity of the cache. In addition, a capacity of a configuration area in each disk is configured based on a RAID type. A remaining capacity excluding the capacity of the security area and the capacity of the configuration area may be used as a capacity of the data area.

In addition, as shown in FIG. 1, for any disk, when a part of space is divided from a data area to be used as a security area to back up the data in the cache, a spatial location of a security area in the disk is usually in the last space of the data area, to ensure continuity of the data area. That is, an address range corresponding to the security area configured in each disk is located after an address range corresponding to the data area configured in the same disk.

Optionally, the address range corresponding to the security area configured in each disk may be located before the address range corresponding to the data area configured in the same disk, provided that the data area in each disk is complete. In other words, a specific location of a security area in a disk is not limited in the embodiments of this application.

In addition, as shown in FIG. 1, the RAID controller further includes a data backup module and a data restoration module. The data backup module is configured to back up the data in the cache to a security area of a disk. The data restoration module is configured to restore the data backed up in the security area of the disk to the cache. The data restoration method provided in this embodiment of this application may be implemented by using the data backup module and the data restoration module. In addition, specific functions of the data backup module and the data restoration module are described in detail in the following embodiments, and are not described herein again.

In addition, FIG. 1 uses a RAID such as the RAID 5 including five disks as an example for description, and the five disks are respectively marked as a disk 1, a disk 2, a disk 3, a disk 4, and a disk 5. It should be noted that a quantity of disks and an architecture of the RAID 5 in FIG. 1 are merely for ease of description, and a RAID type used by the system and a quantity of disks included are not limited in this application.

The following describes the data restoration method provided in this embodiment of this application.

Figure 3:
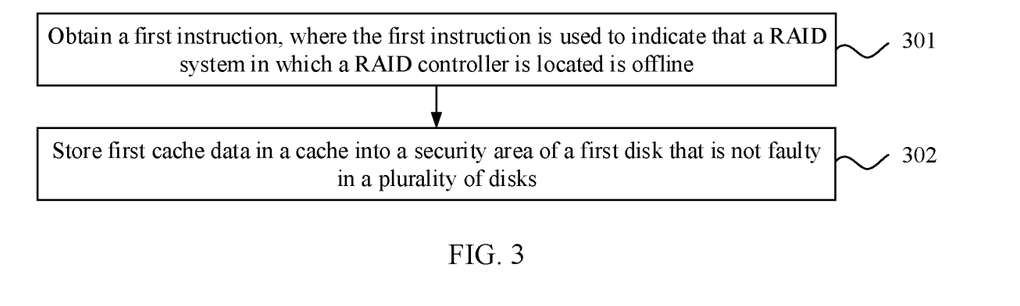
FIG. 3 is a flowchart of a data restoration method according to an embodiment of this application.

FIG. 3 is a flowchart of a data restoration method according to an embodiment of this application, and is applied to the system shown in FIG. 1. As shown in FIG. 3, the method includes the following steps.

Step 301: Obtain a first instruction, where the first instruction is used to indicate that the RAID system in which the RAID controller is located is offline.

It can be learned based on the foregoing content that the RAID controller may obtain the first instruction in two scenarios. One offline scenario is that a disk in the RAID system is faulty. In this case, the RAID system being offline means that a quantity of faulty disks in a plurality of disks is greater than an allowed quantity. The allowed quantity is a quantity of disks that are allowed to be faulty in the RAID system.

For example, for the RAID 5, because a quantity of disks that are allowed to be faulty is 1, when one disk in the RAID is faulty, the RAID controller does not detect the first instruction. When two disks in the RAID are faulty, the quantity of faulty disks exceeds the allowed quantity 1. In this case, the RAID controller detects the first instruction.

Figure 4:
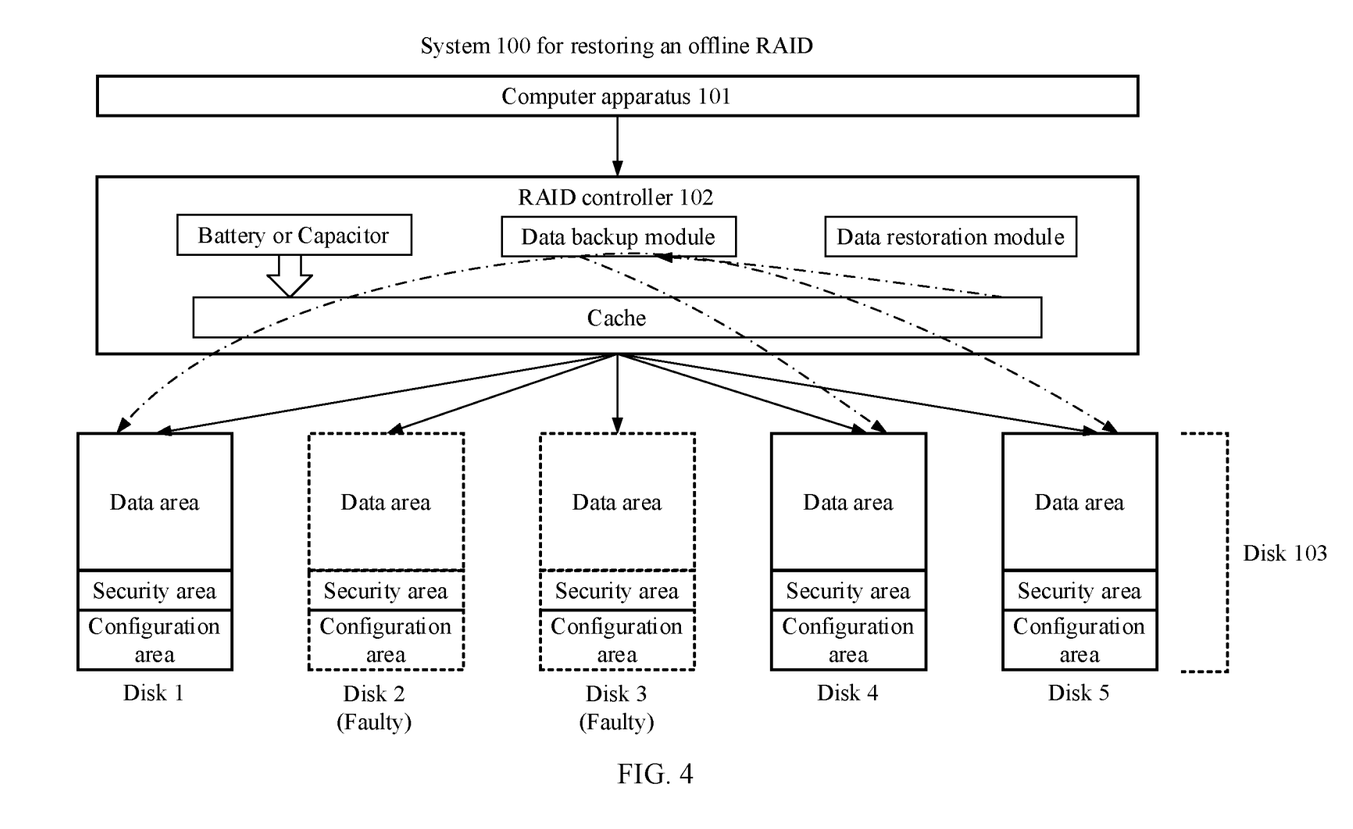
FIG. 4 is a schematic diagram of a data backup process in which a RAID is offline due to a fault of a disk according to an embodiment of this application.

For the RAID 5, as shown in FIG. 4, when the disk 2 is faulty, the RAID is in a degraded state and can still work normally. When the disk 3 is also faulty, the RAID system cannot work normally, that is, cannot provide a storage function. In this case, a write request of the operating system in the computer apparatus is not delivered. In this case, the RAID controller detects the first instruction.

For another example, for the RAID 6, because a quantity of disks that are allowed to be faulty is 2, when one or two disks in the RAID are faulty, the RAID controller does not detect the first instruction. When three disks in the RAID are faulty, the quantity of faulty disks exceeds the allowed quantity 2. In this case, the RAID controller detects the first instruction.

It should be noted that, the disk in the RAID controller being faulty may mean that the disk is offline, or data returned by the disk is incorrect. In either case, the RAID controller can determine whether the disk is faulty by using a signal fed back by an interface between the RAID controller and the disk.

The other offline scenario is that the RAID controller in the RAID system is faulty. The RAID controller being faulty may mean that a piece of hardware in the RAID controller does not respond or the RAID controller cannot normally process data due to other reasons. In this scenario, if a control center that is in the RAID controller and that is used to manage each module still works normally, the control center in the RAID controller generates the first instruction. In addition, if the RAID controller is faulty, the entire RAID controller cannot work normally. In this case, the computer apparatus may generate the first instruction, to back up first cache data through the following step 302.

Step 302: Store the first cache data in the cache into a security area of a first disk that is not faulty in the plurality of disks.

In this embodiment of this application, to avoid a data loss in the cache in a process of restoring the offline RAID system, when obtaining the first instruction through step 301, the RAID controller may back up data in the cache through step 302. As shown in FIG. 1, step 302 may be specifically implemented by using the data backup module in the RAID controller.

In addition, to flexibly manage a security area in a disk, an interface for enabling the security area is further configured in the RAID controller, and the interface may be a logical interface. Therefore, when obtaining the first instruction through step 301, the RAID controller may first determine to enable the security area through the interface, and then back up the first cache data through step 302.

It can be learned from step 301 that the RAID system may be offline due to a fault of a disk. Therefore, to ensure that the first cache data can be successfully backed up to a disk, the first cache data needs to be stored into the security area of the first disk that is not faulty in the plurality of disks. The first disk may also be referred to as a valid disk. The first disk may include one or more disks.

If the RAID system is offline due to the fault of the disk, the first disk is a disk that is not faulty in the plurality of disks. For example, for the RAID 5 shown in FIG. 1, it is assumed that the disk 2 and the disk 3 are faulty. In this case, the first disk is one or more of the disk 1, the disk 4, and the disk 5.

If the RAID system is offline due to a fault of the RAID controller, the first disk refers to the plurality of disks included in the RAID system. For example, for the RAID 5 shown in FIG. 1, in this scenario, the first disk includes one or more of the disk 1, the disk 2, the disk 3, the disk 4, and the disk 5.

In addition, in step 302, the storing the first cache data into a security area of a first disk in the plurality of disks may mean storing the first cache data to a first disk selected from a plurality of first disks. In this case, the first cache data is backed up in a security area of a disk.

Optionally, to improve efficiency of writing the first cache data, the first cache data may also be backed up in a distributed storage manner. That is, the first cache data is divided into a plurality of data blocks, and then the plurality of data blocks are stored in the plurality of first disks in a distributed manner according to a specific rule. As shown in FIG. 4, there are three first disks, which are the disk 1, the disk 4, and the disk 5 in FIG. 1. The first cache data may be divided into data blocks, and the data blocks are stored in the disk 1, the disk 4, and the disk 5 in a distributed manner. For example, the first cache data is divided into seven data blocks, which are respectively marked as a data block 1, a data block 2, a data block 3, a data block 4, a data block 5, a data block 6, and a data block 7. In this case, one data block is written to each disk in sequence according to the disk 1, the disk 4, and the disk 5, and finally the data block 1, the data block 4, and the data block 7 are stored into the disk 1. The data block 2 and the data block 5 are stored into the disk 4. The data block 3 and the data block 6 are stored into the disk 5.

In addition, when the first cache data is stored into the security area, the first cache data may be further stored in a manner of adding a verification mechanism. That is, when the first cache data is stored, verification information for the first cache data may be further stored. Therefore, when some data in the first cache data is lost, the first cache data may be restored by using the verification information. A specific implementation of storing the first cache data by adding the verification mechanism is not described in detail herein.

According to the embodiment shown in FIG. 3, when the RAID system is offline, the data in the cache can be backed up, to avoid a data loss in the cache in a subsequent RAID system restoration process.

The embodiment shown in FIG. 3 is used to explain how to back up the data in the cache when the RAID system is offline. When the offline RAID system is restored, backup data may be used to restore the data in the cache. The following embodiments are used to explain the process in detail. In addition, as shown in FIG. 1, the following embodiments may be implemented by using the data restoration module in the RAID controller.

Figure 6:
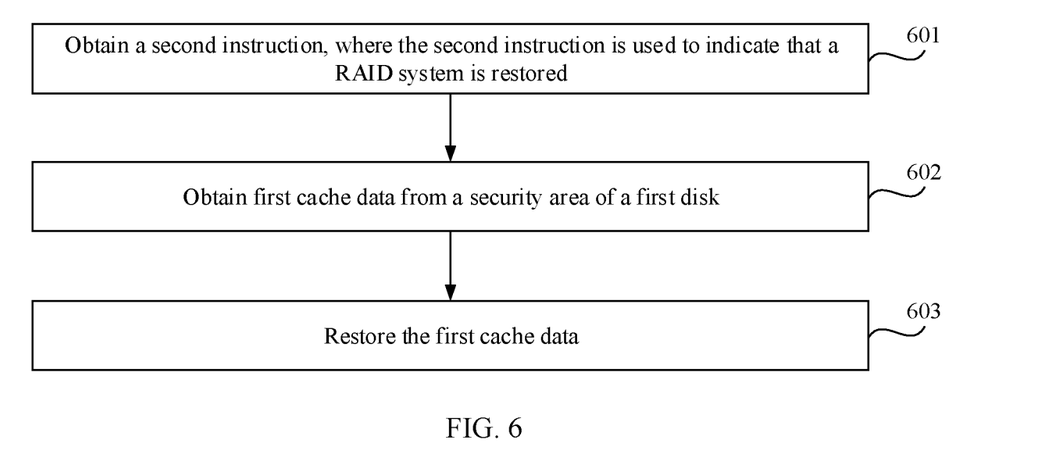
FIG. 6 is a flowchart of another data restoration method according to an embodiment of this application.

FIG. 6 is a flowchart of another data restoration method according to an embodiment of this application, and is used to explain and describe a process of restoring the data in the cache by using backup data. As shown in FIG. 6, the method includes the following steps.

Step 601: Obtain a second instruction, where the second instruction is used to indicate that the RAID system is restored.

The first cache data may be backed up through the foregoing step 302. Because the first cache data has been backed up, a skilled person may directly restore the offline RAID system, so that the offline RAID system works normally. Therefore, when the RAID system is restored, the RAID controller obtains the second instruction in step 601. The skilled person may restore the offline RAID system by restoring a faulty disk or replacing the faulty RAID controller, and a specific manner is determined based on an offline scenario. That is, the RAID being restored in step 601 means that a quantity of faulty disks in the plurality of disks is less than or equal to the allowed quantity in step 301 after disk restoration, or the faulty RAID controller has been replaced.

If the RAID system is offline due to a fault of a disk, the skilled person can restore the RAID system by restoring the disk. In this scenario, the RAID system being offline means that the quantity of faulty disks in the plurality of disks is greater than the allowed quantity. Therefore, in this scenario, the RAID system being restored means that the quantity of faulty disks in the plurality of disks is less than or equal to the allowed quantity obtained after the disk restoration.

There are a plurality of possible causes for the fault of the disk. For example, a bad block in the disk causes a read/write operation failure, and then the disk is removed from a RAID group by the RAID controller. In this case, after the skilled person removes and then inserts the disk, if the RAID controller identifies the disk as a disk with a RAID configuration, the RAID configuration of the disk is further imported to restore the RAID group. The skilled person can mirror data in the disk with the bad block to a new disk, and then insert the new disk into the RAID controller to try to restore the RAID system.

In addition, in a case in which the RAID system is offline due to faults of a plurality of disks, currently required data may be recorded in the last faulty disk. Therefore, the disks may be restored based on time intervals between fault occurrence time and current time in ascending order, so that the operating system can obtain the required data. That is, a disk that is faulty later is restored first, and then a disk that is faulty earlier is restored, until the quantity of faulty disks is less than or equal to the allowed quantity.

Figure 5:
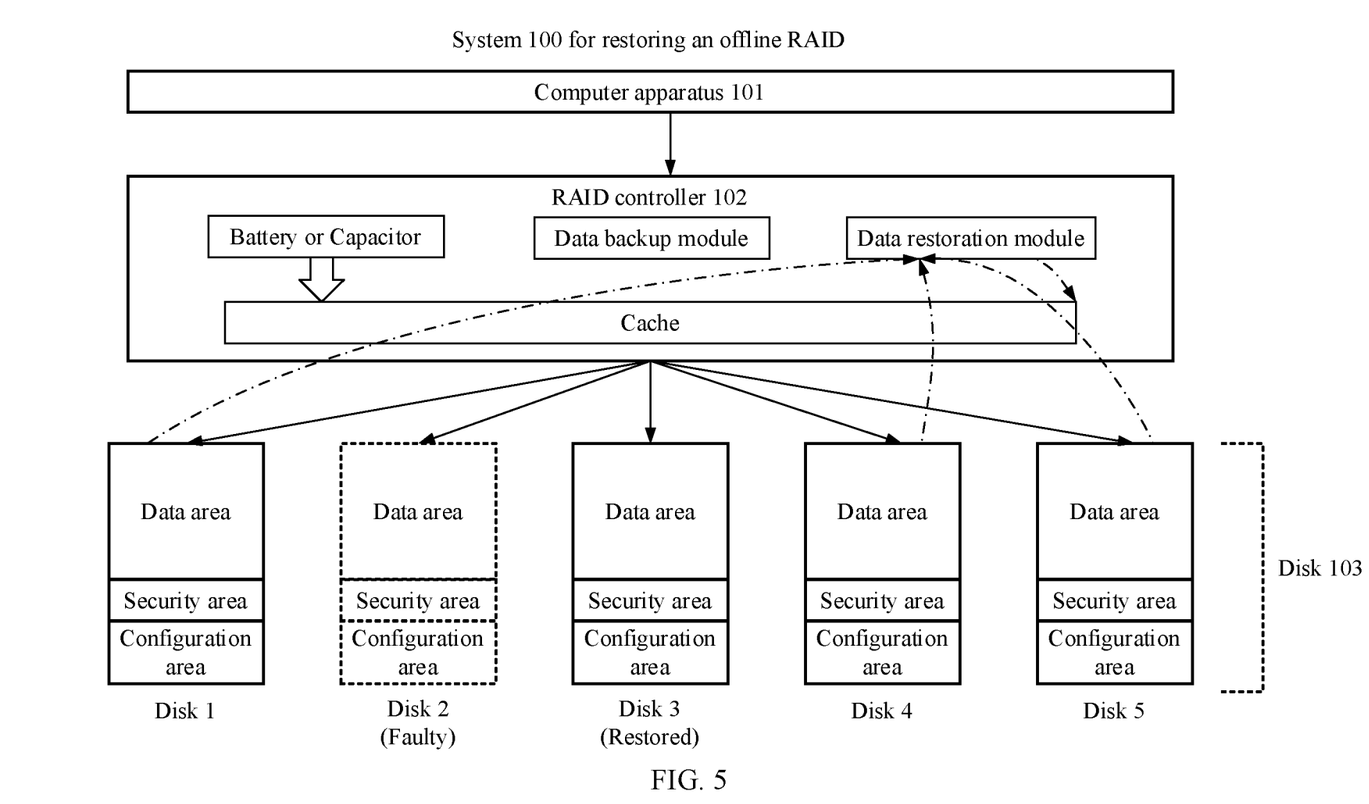
FIG. 5 is a schematic diagram of a data restoration process in which a RAID is offline due to a fault of a disk according to an embodiment of this application.

For example, for the RAID 5 shown in FIG. 1, as shown in FIG. 4, it is assumed that the RAID system is offline because the disk 2 and the disk 3 are faulty, and the disk 3 is the last faulty disk. Therefore, as shown in FIG. 5, when the disk restoration is performed, the disk 3 is first restored. After the disk 3 is restored, a status of the RAID system changes from the offline state to a degraded state, and the RAID system is restored.

Step 602: Obtain the first cache data from the security area of the first disk.

After the RAID controller is restored, the RAID controller may obtain backup data of the first cache data to restore the first cache data through the following steps. A specific implementation in which the RAID controller obtains the backup data of the first cache data is related to a manner of storing the first cache data according to the embodiment shown in FIG. 3. Details are not described herein again.

For example, for the manner of storing the first cache data in a distributed manner shown in FIG. 4, as shown in FIG. 5, because the first cache data is stored in the disk 1, the disk 4, and the disk 5 in a distributed manner, the data restoration module may obtain the first cache data from the disk 1, the disk 4, and the disk 5.

Step 603: Restore the first cache data.

For different offline scenarios, the first cache data may be stored into data areas in the disks of the restored RAID system in different manners. For a specific implementation, refer to the following description.

For the scenario in which the RAID system is offline due to a fault of a disk, data in the restored disk may be incompatible with the original data in the cache. Therefore, in this embodiment of this application, in this scenario, the data in the cache is not cleared before disk restoration, to subsequently determine, based on whether the data in the cache is consistent with the first cache data, whether to flush the first cache data to disks.

In this case, an implementation of step 603 may be: obtaining second cache data in the cache obtained after the disk restoration; and when the second cache data is consistent with the first cache data, storing the first cache data into the data areas of the plurality of disks obtained after the disk restoration.

After the second cache data in the cache after the disk restoration is obtained, it may be determined whether the first cache data is consistent with the second cache data. If the second cache data is consistent with the first cache data, it indicates that the data in the restored disk does not conflict with the first cache data. In this case, the first cache data may be written to data areas of disks that are of the plurality of disks and that are not faulty after the disk restoration.

Correspondingly, if the second cache data is inconsistent with the first cache data, it indicates that the data in the restored disk conflicts with the first cache data. In this case, cache data flush prompt information may be generated, where the cache data flush prompt information is used to prompt whether to flush the first cache data to the disks. The cache data flush prompt information is sent to an administrator end. If an acknowledgment message that is sent by the administrator end and that is used to indicate to store the first cache data into the data areas of the plurality of disks that work normally is received, the first cache data is flushed to the disk.

That is, the first cache data is directly restored when the data in the restored disk does not conflict with the first cache data. When the data in the restored disk conflicts with the first cache data, the first cache data is restored only when a user prompts that the first cache data can be flushed to the disk.

In addition, in a case in which the data in the restored disk conflicts with the first cache data, after the cache data flush prompt information is sent to the administrator end, if a discard message that is sent by the administrator end and that is used to indicate to clear the first cache data is received, the first cache data is cleared. That is, in the case in which the data in the restored disk conflicts with the first cache data, if the user indicates that the first cache data does not need to be flushed to the disk, the first cache data does not need to be restored.

Figure 7:
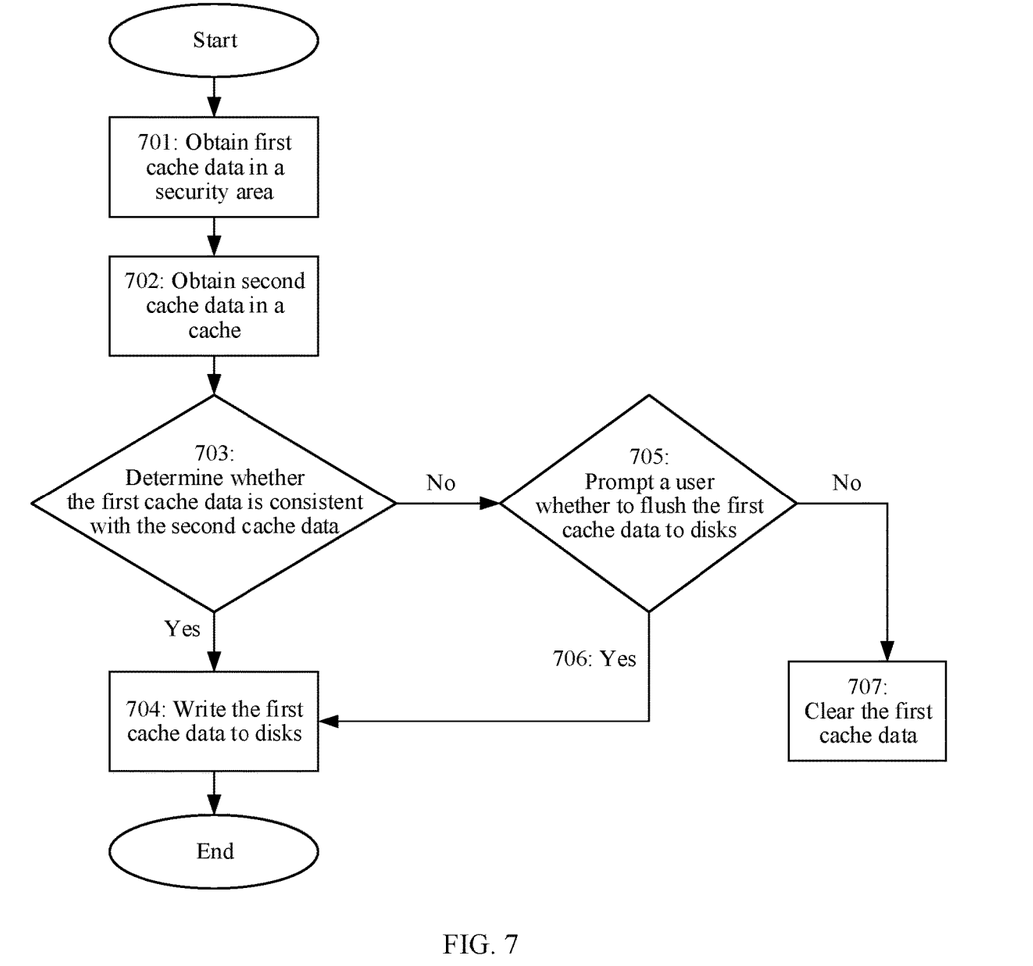
FIG. 7 is a schematic diagram of another data restoration process according to an embodiment of this application.

The foregoing data restoration process may be implemented by using a schematic diagram of data restoration shown in FIG. 7. As shown in FIG. 7, the data restoration process may include the following steps:

Step 701: Obtain the first cache data in the security area.

Step 702: Obtain the second cache data in the cache.

Step 703: Determine whether the first cache data is consistent with the second cache data.

Step 704: If the first cache data is consistent with the second cache data, write the first cache data to disks.

Step 705: If the first cache data is inconsistent with the second cache data, prompt the user whether to flush the first cache data to the disks.

Step 706: If the user determines that the first cache data needs to be flushed to the disks, write the first cache data to the disks.

Step 707: If the user determines that the first cache data does not need to be flushed to the disks, clear the first cache data.

Each step in the schematic diagram of the data restoration shown in FIG. 7 has been described in detail in the foregoing step 601 to step 603. Details are not described herein again.

An external interface may be configured in the RAID controller. The external interface is configured to connect to the administrator end, to implement communication between the RAID controller and the administrator end.

Optionally, in the scenario in which the RAID system is offline due to a fault of a disk, the RAID controller may also forcibly write the first cache data to the disks, without determining whether the data in the restored disk conflicts with the first cache data. That is, after the first cache data is obtained, the first cache data is directly stored into the data areas of the plurality of disks obtained after the faulty disk restoration.

The foregoing describes how to restore the first cache data in the scenario in which the RAID system is offline due to a fault of a disk. Optionally, if the RAID system is offline due to a fault of the RAID controller, after the RAID controller is replaced, that is, after the RAID system is restored, and the first cache data is obtained, the first cache data may be stored into the data areas of the plurality of disks that work normally. Because a cache is also configured in a replaced RAID controller, an implementation of storing the first cache data into the data areas of the plurality of disks that work normally may be as follows: The RAID controller writes the first cache data to the cache of the replaced RAID controller, so that when a flush instruction for data in the cache is detected subsequently, data in the cache of the replaced RAID controller is written to the data areas in disks in the RAID in which the RAID controller is replaced.

The flush instruction for the data in the cache may be automatically triggered by a controller. For example, the RAID controller may periodically generate the flush instruction for the data in the cache. Alternatively, the flush instruction for the data in the cache may be generated when it is detected that an amount of the data in the cache exceeds a threshold.

In addition, after the first cache data in the security area is restored through the foregoing step 601 and step 603, to facilitate backup of the data in the cache in a timely manner when the RAID controller is offline next time, the first cache data stored into security areas in one or more valid disks may be cleared. That is, each time the first cache data is restored, data in the security area is cleared in time. In this way, when the RAID system is offline again, the data in the cache can be directly backed up in the security area in which the data is cleared.

Optionally, after the first cache data in the security area is restored through the foregoing step 601 and step 603, the data in the security area may not be cleared. In this case, current backup data can be directly overwritten into the security area. However, to avoid that the current backup data, instead of all data stored into the security area, can be accurately obtained during subsequent data restoration, when the current backup data is stored into the security area, a start location and an end location of the current storage data need to be marked.

In the embodiment shown in FIG. 6, the data in the cache is backed up before data restoration. Therefore, after the offline RAID is restored, the data in the cache can be restored by using the foregoing embodiment.

Figure 8:
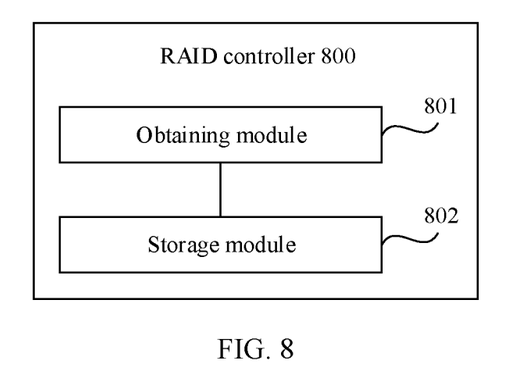
FIG. 8 is a block diagram of a data restoration apparatus according to an embodiment of this application.

FIG. 8 is a schematic diagram of a RAID controller according to an embodiment of this application. The RAID controller is connected to a plurality of disks, a data area and a security area are configured in each of the plurality of disks, and a cache is configured in the RAID controller. As shown in FIG. 8, the RAID controller 800 includes an obtaining module 801 and a storage module 802.

The obtaining module 801 is configured to obtain a first instruction, where the first instruction is used to indicate that a RAID system in which the RAID controller is located is offline, and the RAID system being offline means that a quantity of faulty disks in the plurality of disks is greater than an allowed quantity. For a specific implementation, refer to step 301 in the embodiment in FIG. 3.

The storage module 802 is configured to store first cache data in the cache into a security area of a first disk that is not faulty in the plurality of disks. For a specific implementation, refer to step 302 in the embodiment in FIG. 3.

Optionally, the obtaining module is further configured to obtain a second instruction, where the second instruction is used to indicate that the RAID system is restored, and the RAID system being restored means that the quantity of faulty disks in the plurality of disks is less than or equal to the allowed quantity after faulty disk restoration. For a specific implementation, refer to step 601 in the embodiment in FIG. 6.

The obtaining module is further configured to obtain the first cache data from the security area of the first disk. For a specific implementation, refer to step 602 in the embodiment in FIG. 6 and step 701 in the embodiment in FIG. 7.

The storage module is further configured to store the first cache data into the data areas of the plurality of disks obtained after disk restoration. For a specific implementation, refer to step 603 in the embodiment in FIG. 6 and step 702 to step 706 in the embodiment in FIG. 7.

Optionally, the obtaining module is further configured to obtain second cache data in the cache obtained after the disk restoration. For a specific implementation, refer to step 702 in the embodiment in FIG. 7.

The storage module is further configured to: when the first cache data is consistent with the second cache data, store the first cache data into the data areas of the plurality of disks obtained after the disk restoration. For a specific implementation, refer to step 704 in the embodiment in FIG. 7.

Optionally, the RAID controller further includes:

a sending module, configured to: when the second cache data is inconsistent with the first cache data, send cache data flush prompt information to an administrator end, where the cache data flush prompt information is used to prompt whether to flush the first cache data to disks. For a specific implementation, refer to step 705 in the embodiment in FIG. 7.

The storage module is further configured to: when an acknowledgment message is received, store the first cache data into the data areas of the plurality of disks obtained after the disk restoration. The acknowledgment message is used to indicate to store the first cache data into the data areas of the plurality of disks obtained after the disk restoration. For a specific implementation, refer to step 706 in the embodiment in FIG. 7.

Optionally, the RAID controller further includes a receiving module, configured to receive a discard message, where the discard message is used to indicate to clear the first cache data. For a specific implementation, refer to step 707 in the embodiment in FIG. 7.

Optionally, a total capacity of security areas configured in the plurality of disks is greater than or equal to a capacity of the cache, to ensure that the data in the cache can be stored into the security areas.

Optionally, an address range corresponding to the security area configured in each disk is located after an address range corresponding to the data area configured in the same disk, to ensure continuity of the data area.

In this application, to avoid a data loss in the cache in a process of restoring the offline RAID system, a security area is configured in a disk, where the security area is used to back up the data in the cache of the RAID controller in the process of restoring the offline RAID system. Therefore, when the first instruction used to indicate that the RAID system is offline is detected, the data in the cache may be backed up to the security area, and then the RAID system is restored. In this way, after the RAID system is restored, the RAID system can obtain backup data of the data in the cache from the security area, to avoid problems such as an operating system startup failure or a user data loss caused by the data loss in the cache.

It should be noted that, when the RAID controller provided in the foregoing embodiments restores the data, division of the functional modules is merely used as an example for description. In actual application, the foregoing functions may be allocated to different functional modules for implementation based on a requirement. To be specific, an internal structure of the device is divided into different functional modules, to implement all or some of the foregoing functions. In addition, the RAID controller provided in the foregoing embodiment and the method embodiment of data restoration belong to a same concept. For a specific implementation process, refer to the method embodiment. Details are not described herein again.

Figure 9:
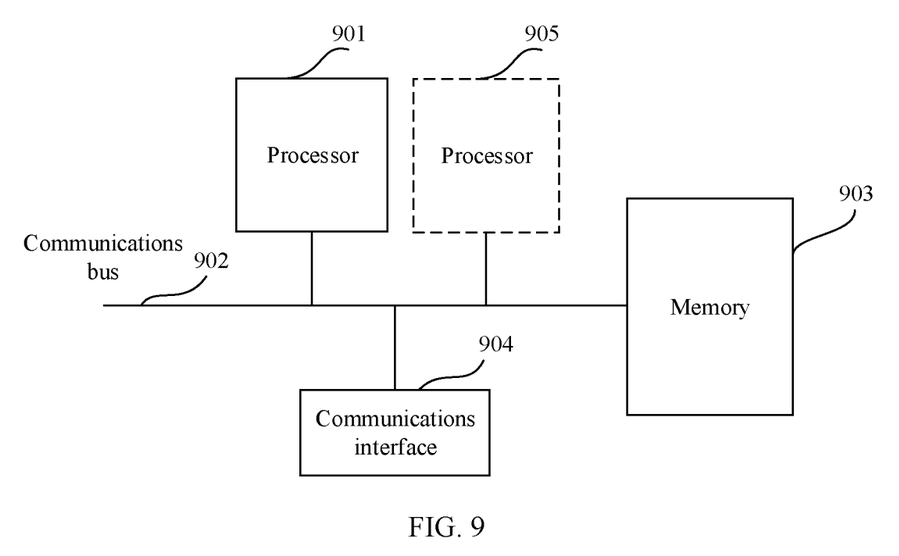
FIG. 9 is a schematic diagram of a structure of an electronic device according to an embodiment of this application.

FIG. 9 is a schematic diagram of a structure of an electronic device according to an embodiment of this application. The RAID controller or the computer apparatus in the foregoing embodiment may be implemented by using the electronic device shown in FIG. 9. Refer to FIG. 9. The electronic device includes at least one processor 901, a communications bus 902, a memory 903, and at least one communications interface 904.

The processor 901 may be a central processing unit (CPU), an application-specific integrated circuit (ASIC), or one or more integrated circuits configured to control program execution of solutions of this application.

The communications bus 902 may include a path for transmitting information between the foregoing components.

The memory 903 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a disk or another magnetic storage device, or any other medium that can be used to carry or store expected program code in a form of instructions or a data structure and that can be accessed by a computer. However, the memory is not limited thereto. The memory 903 may exist independently, and is connected to the processor 901 through the communications bus 902. Alternatively, the memory 903 may be integrated with the processor 901.

The memory 903 is configured to store program code for performing the solutions in this application, and the program code is executed under control of the processor 901. The processor 901 is configured to execute the program code stored in the memory 903. The program code may include one or more software modules. The RAID controller may determine, by using the processor 901 and the one or more software modules in the program code in the memory 903, data used for application development. The one or more software modules may be any module in FIG. 8.

The communications interface 904 is configured to communicate with another device or a communications network such as the Ethernet, a radio access network (RAN), or wireless local area networks (WLAN) by using any apparatus such as a transceiver.

In specific implementation, in an embodiment, the electronic device may include a plurality of processors, for example, the processor 901 and a processor 905 shown in FIG. 9. Each of the processors may be a single-core (single-CPU) processor, or may be a multi-core (multi-CPU) processor. The processor herein may refer to one or more devices, circuits, and/or processing cores configured to process data (for example, computer program instructions).

The electronic device may be a general-purpose electronic device or a dedicated electronic device. In specific implementation, the electronic device may be a desktop computer, a portable computer, a network server, a personal digital assistant (PDA), a mobile phone, a tablet computer, a wireless terminal device, a communications device, or an embedded device. A type of the electronic device is not limited in this embodiment of this application.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk, or a magnetic tape), an optical medium (for example, a digital versatile disc (digital versatile disc, DVD)), a semiconductor medium (for example, a solid state drive (SSD)), or the like.

A person of ordinary skill in the art may understand that all or some of the steps in the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the principle of this application should fall within the protection scope of this application.

What is claimed is:

1. A data restoration method, implemented by a redundant array of independent disks (RAID) controller coupled to a plurality of disks, with a data area and a security area configured in each of the plurality of disks and a cache configured in the RAID controller, the data restoration method comprising:
    obtaining a first instruction, wherein the first instruction indicates that a RAID system in which the RAID controller is located is offline, and the RAID system being offline means that a quantity of faulty disks in the plurality of disks is greater than an allowed quantity;
    storing cache data in the cache into a security area of a first disk as first cache data, wherein the first disk is not faulty in the plurality of disks, and wherein the cache data remains in the cache;
    obtaining a second instruction, wherein the second instruction indicates that the RAID system is restored, and the RAID system being restored means that the quantity of faulty disks in the plurality of disks is less than or equal to the allowed quantity after faulty disk restoration;
    obtaining the first cache data from the security area of the first disk;
    obtaining second cache data in the cache, wherein the second cache data is the cache data in the cache obtained after the disk restoration; and
    when the first cache data is consistent with the second cache data, storing the first cache data into the data areas of the plurality of disks obtained after the disk restoration.

2. The method of claim 1, wherein after the obtaining second cache data in the cache obtained after the disk restoration, the method further comprises:
    when the second cache data is inconsistent with the first cache data, sending cache data flush prompt information to an administrator end, wherein the cache data flush prompt information is used to prompt whether to flush the first cache data to disks; and
    when an acknowledgment message is received, storing the first cache data into the data areas of the plurality of disks obtained after the disk restoration, wherein the acknowledgment message indicates to store the first cache data into the data areas of the plurality of disks obtained after the disk restoration.

3. The method of claim 1, wherein an address range corresponding to the security area configured in each disk is located after an address range corresponding to the data area is configured in the same disk.

4. A redundant array of independent disks (RAID) controller coupled to a plurality of disks, with a data area and a security area configured in each of the plurality of disks, and a cache configured in the RAID controller, the RAID controller comprising:
    a memory storing programming instructions;
    one or more processors coupled to the memory, wherein the one or more processors are configured to execute the programming instructions to cause the RAID controller to perform steps of:
    obtaining a first instruction, wherein the first instruction indicates that a RAID system in which the RAID controller is located is offline, and the RAID system being offline means that a quantity of faulty disks in the plurality of disks is greater than an allowed quantity;
    storing cache data in the cache into a security area of a first disk as first cache data, wherein the first disk is not faulty in the plurality of disks, and wherein the cache data remains in the cache;
    obtaining a second instruction, wherein the second instruction indicates that the RAID system is restored, and the RAID system being restored means that the quantity of faulty disks in the plurality of disks is less than or equal to the allowed quantity after faulty disk restoration;
    obtaining the first cache data from the security area of the first disk;
    obtaining second cache data in the cache, wherein the second cache data is the cache data in the cache obtained after the disk restoration; and
    when the first cache data is consistent with the second cache data, storing the first cache data into the data areas of the plurality of disks obtained after the disk restoration.

5. The RAID controller of claim 4, wherein the one or more processors are further configured to execute the programming instructions to cause the RAID controller to perform steps of:
    when the second cache data is inconsistent with the first cache data, sending cache data flush prompt information to an administrator end, wherein the cache data flush prompt information prompts whether to flush the first cache data to disks; and
    when an acknowledgment message is received, storing the first cache data into the data areas of the plurality of disks obtained after the disk restoration, wherein the acknowledgment message indicates to store the first cache data into the data areas of the plurality of disks obtained after the disk restoration.

6. The RAID controller of claim 4, wherein an address range corresponding to the security area configured in each disk is located after an address range corresponding to the data area is configured in the same disk.

7. A computer system, comprising:
a redundant array of independent disks (RAID) controller coupled to a plurality of disks, wherein a data area and a security area are configured in each of the plurality of disks, and a cache is configured in the RAID controller, and wherein the RAID controller is configured to:
obtain a first instruction, wherein the first instruction indicates that a RAID system in which the RAID controller is located is offline, and the RAID system being offline means that a quantity of faulty disks in the plurality of disks is greater than an allowed quantity;
store cache data in the cache into a security area of a first disk as first cache data, wherein the first disk is not faulty in the plurality of disks, and wherein the cache data remains in the cache;
obtain a second instruction, wherein the second instruction indicates that the RAID system is restored, and the RAID system being restored means that the quantity of faulty disks in the plurality of disks is less than or equal to the allowed quantity after faulty disk restoration;
obtain the first cache data from the security area of the first disk;
obtain second cache data in the cache, wherein the second cache data is the cache data in the cache obtained after the disk restoration; and
when the first cache data is consistent with the second cache data, store the first cache data into the data areas of the plurality of disks obtained after the disk restoration.

8. The computer system of claim 7, wherein the RAID controller is further configured to:
when the second cache data is inconsistent with the first cache data, send cache data flush prompt information to an administrator end, wherein the cache data flush prompt prompts whether to flush the first cache data to disks; and
when an acknowledgment message is received, store the first cache data into the data areas of the plurality of disks obtained after the disk restoration, wherein the acknowledgment message indicates to store the first cache data into the data areas of the plurality of disks obtained after the disk restoration.

9. The computer system of claim 7, wherein an address range corresponding to the security area configured in each disk is located after an address range corresponding to the data area is configured in the same disk.

* * * * *